United States Patent [19]

Isono et al.

[11] Patent Number: 4,920,531
[45] Date of Patent: * Apr. 24, 1990

[54] HEADER DRIVEN PACKET SWITCHING SYSTEM AND METHOD

[75] Inventors: Osamu Isono; Tetsuo Nishino, both of Kawasaki; Eisuke Iwabuchi, Yokohama, all of Japan

[73] Assignee: Fujitsu Limited, Kawasaki, Japan

[*] Notice: The portion of the term of this patent subsequent to Jun. 6, 2006 has been disclaimed.

[21] Appl. No.: 157,621

[22] Filed: Feb. 19, 1988

[30] Foreign Application Priority Data

Feb. 19, 1987 [JP] Japan .................................. 62-36736

[51] Int. Cl.⁵ .............................................. H04J 3/26
[52] U.S. Cl. ...................................... 370/60; 370/94.1
[58] Field of Search ......................... 370/60, 94, 110.1

[56] References Cited

U.S. PATENT DOCUMENTS

| | | | |
|---|---|---|---|
| 4,596,010 | 6/1986 | Beckner et al. | 370/60 |
| 4,692,917 | 9/1987 | Fujioka | 370/60 |
| 4,755,986 | 7/1988 | Hirata | 370/94 |
| 4,761,779 | 8/1988 | Nara et al. | 370/60 |
| 4,837,761 | 6/1989 | Isono et al. | 370/60 |

Primary Examiner—Douglas W. Olms
Assistant Examiner—Min Jung
Attorney, Agent, or Firm—Staas & Halsey

[57] ABSTRACT

A header driven packet switching system includes packet header processing circuits for controlling the routing and header rewriting of data packets. The packet header processing circuits are the hunted type and are arranged independently from incoming lines so that a packet switching capacity of the system will be improved, a high speed packet switching realized, and an improved flexibility of the system against traffic congestion will be obtained. In addition, it is possible to arrange the packet header processing circuits according to traffic conditions.

13 Claims, 9 Drawing Sheets

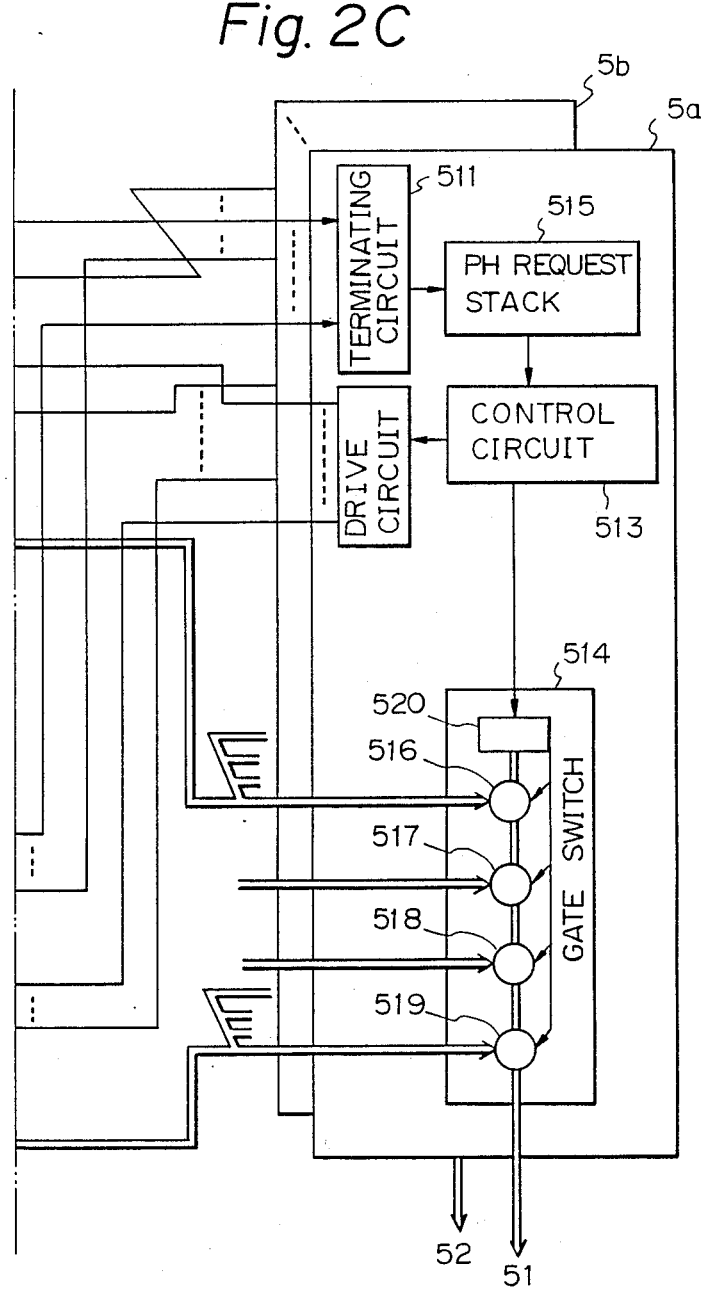

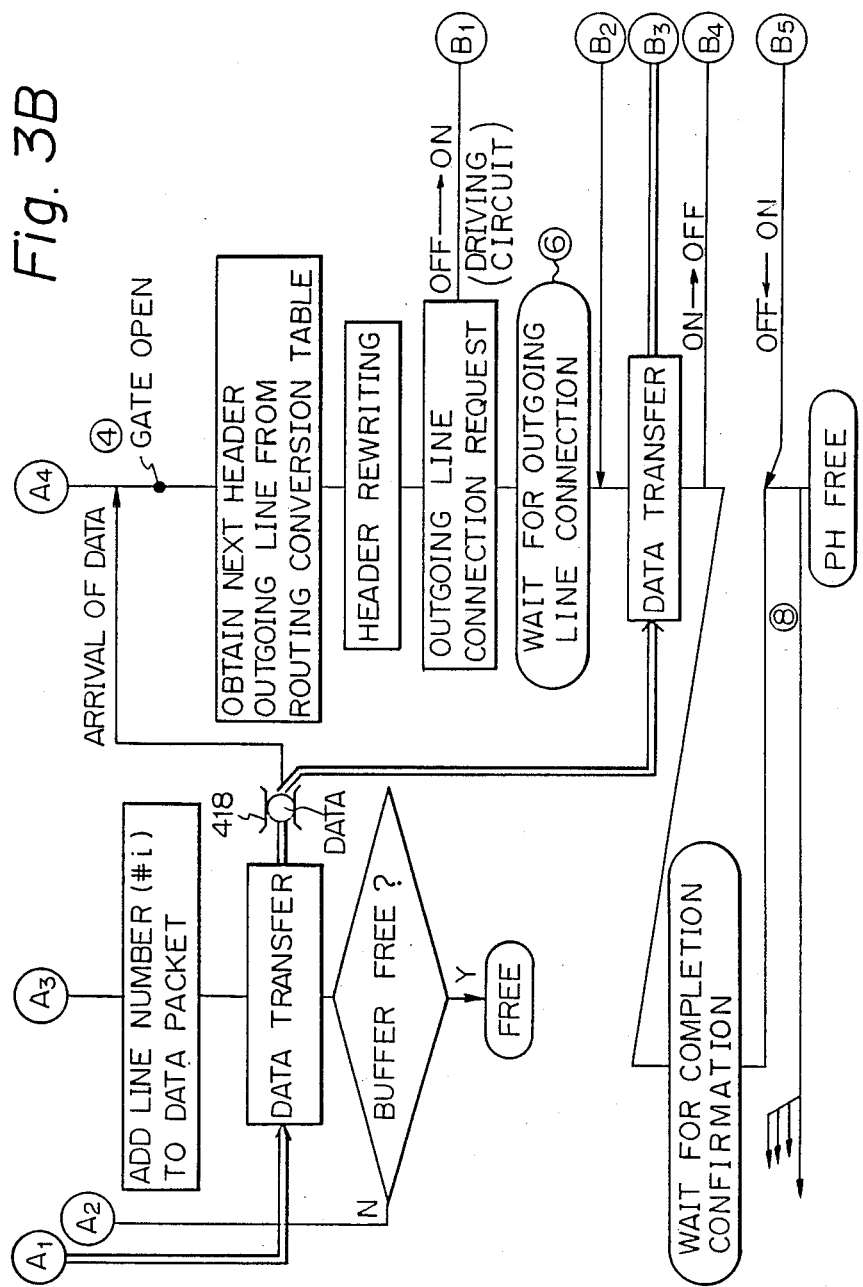

DATA PACKET

ROUTING CONVERSION TABLE

HEADER DRIVEN PACKET SWITCHING SYSTEM AND METHOD

BACKGROUND OF THE INVENTION

Field of the Invention

The present invention relates to a header driven packet switching system and method.

Information communication by packet switching systems has been found satisfactory for communicating data with respect to data processing units, and it is expected that such systems will become widely used.

The field of the header driven packet switching system to which the present invention relates lies between the field of circuit switching systems, in which the available data rate for each line is fixed, and the field of packet switching systems, in which any data rate is used.

In a header driven type packet switching system, data is transmitted as packets and speech paths are circuit switched.

The basic functions required for this switching system are a routing function, for decoding the header of an input packet to transfer it to a destination, and a function for rewriting the header with the virtual call number of a selected line.

Such a prior art header driven type packet switching system is disclosed, for example, in Japanese Unexamined Patent Publication No. 61-127250.

In a conventional header driven type packet switching system, header processing circuits, each of which decodes the header of an input packet, rewrites the information in the header, and transmits a control signal to a switching portion to select an outgoing line for the packet, are provided only in a fixed correspondence with incoming lines of the switching system.

Therefore, when a plurality of packets are continuously transmitted through a particular incoming line, the first packet must be completely processed before the next packet can be processed, and thus the processing of the following packets may be greatly delayed, or those packets may have to be dropped.

SUMMARY OF THE INVENTION

To solve the above mentioned problem, an object of the present invention is to provide a header driven packet switching system and method in which, by providing header processing circuits arranged independently of the incoming lines, successive data packets can be efficiently and flexibly processed without overlong delay.

To attain the above object, there is provided, according to the present invention, a header driven packet switching system including hardware for routing a data packet coming through one of the incoming lines and rewriting a header of the data packet according to routing information such as a virtual call number and a line number added to the header of the data packet.

The system comprises a plurality of packet header processing circuits disposed independently from the incoming lines, for controlling the routing and header rewriting of the data packet; and a connecting means for detecting a free circuit among the plurality of packet header processing circuits, and for connecting the required incoming line with the free packet header processing circuit.

According to one aspect of the present invention, the system further comprises a plurality of incoming circuits connected between the incoming lines and the packet header processing circuits. Each of the incoming circuits comprises; a first buffer for temporarily storing a data packet coming through an incoming line; a scanning circuit for scanning the packet header processing circuits; a first drive unit for driving the free header processing circuit; an incoming line number storing means; and a first control means for controlling the first buffer, the scanning circuit, the first drive unit, and the incoming line number storing means; whereby, when the first buffer receives a data packet, the first control means starts a scan of the packet header processing circuits by the scanning circuit to determine a free packet header processing circuit, modifies the received data packet stored in the first buffer by adding the incoming line number to the received data packet, stores the modified data packet in the first buffer, and drives the first drive unit to open the free packet header processing circuit to receive the modified data packet.

According to another aspect of the present invention, the incoming circuits are respectively connected to the incoming lines, and the ratio of the number of incoming circuits and the number of packet header circuits is arbitrarily determined.

According to still another aspect of the present invention, each of the packet header processing circuits comprises: a second drive unit connected to the scanning circuit in each of the incoming line circuits, to determine whether or not a packet header processing circuit is free; a priority control circuit connected to the first drive unit in each of the incoming circuits, to control the competition among process requests from a plurality of the incoming line circuits, to determine which incoming line circuit is to be processed; a first gate connected to the first buffer in each of the incoming circuits, for introducing the modified data packet stored in the first buffer to the free packet header processing circuit; a second control means for controlling the second drive unit and the first gate whereby, when the priority control means determines which incoming line circuit is to be processed, the control means opens the first gate.

According to a still further aspect of the present invention, the connecting means comprises the scanning circuit, the first drive unit, the control means, the second drive unit, the priority control means, the first gate, and the second control.

According to yet another aspect of the present invention, the system further comprises a plurality of outgoing line circuits and each of the packet header processing circuits further comprises: a second buffer for temporarily storing the modified data packet passed through the first gate; a routing conversion table for storing a correspondence between an incoming routing information and an outgoing routing information; a third drive unit for generating an outgoing connection request; and a receiving circuit for receiving a connection complete signal; whereby, when the second buffer receives the modified data packet from the first buffer through the first gate, the second control means closes the first gate and looks up the routing conversion table to determine the outgoing routing information including the next virtual call number and the outgoing line number, and rewrites the header of the modified data packet in the second buffer with the outgoing routing information, and the second control means drives the third drive unit to output the outgoing connection request to a selected one of the outgoing line circuits corresponding to the outgoing line number.

According to a still further aspect of the present invention, each of the outgoing line circuits comprises: a stack memory for sequentially storing the outgoing connection requests from the third drive unit in a sequence of the generation of the outgoing connection requests; a fourth drive unit for generating the connection complete signal; a second gate having a plurality of gates for passing the data packet stored in the second buffer to a selected outgoing line; and a third control means for controlling the stack memory, the fourth drive unit, and the second gate whereby, when the third control means detects an outgoing connection request in the stack memory, the third control means drives the second gate to open a gate corresponding to the selected outgoing line and drives the fourth driving circuit to transfer the connection complete signal from the fourth driving circuit through the receiving circuit to the second control means so that the second control means drives the second buffer to transfer the rewritten data packet from the second buffer through the gate to the selected outgoing line.

According to the present invention, there is also provided a header driven packet switching method for routing a data packet coming through an incoming line and rewriting a header of the data packet according to routing information such as a virtual call number and a line number added to the header of the data packet. The method comprises the steps of: detecting a free circuit among a plurality of packet header processing circuits disposed independently of the incoming lines; and controlling, by the detected free packet header processing circuit, the routing and header rewriting of the data packet.

According to one aspect of the present invention, the detecting step comprises the steps of: temporarily storing a data packet coming through an incoming line; scanning the packet header processing circuits to determine a free packet header processing circuit; adding an incoming line number to the data packet stored in the first buffer memory; and transferring the data packet plus the incoming line number from the first buffer to the free packet header processing circuit.

According to another aspect of the present invention, the method further comprises the steps of: sending information from the packet header processing circuits to the incoming line circuits about whether or not a packet header processing circuit is free; controlling the competition among process requests from a plurality of the incoming line circuits to determine which incoming line circuit is to be processed; and introducing the data packet from the first buffer to the free packet header processing circuit.

According to a still further aspect of the present invention, the controlling step comprises the steps of: temporarily storing the data packet transferred from the first buffer to the free packet header processing circuit; looking up a routing conversion table to determine an outgoing routing information including the next virtual call number and the outgoing line number; rewriting the header of the data packet with the outgoing information; and generating an outgoing connection request to a selected outgoing line circuit corresponding to the outgoing line number.

According to yet another aspect of the present invention, the method further comprises the steps of: opening a gate, corresponding to the selected outgoing line, in the outgoing line circuit in response to the outgoing connection request; transferring a connection complete signal from the outgoing line circuit to the packet header processing circuit; and transferring the data packet from the packet header processing circuit through the gate to the selected outgoing line.

BRIEF DESCRIPTION OF THE DRAWINGS

The above objects and features of the present invention will become more apparent from the following description of the preferred embodiment with reference to the attached drawings, wherein:

FIGS. 2A to 2C are constitutional views showing an embodiment of the present invention;

FIGS. 3A to 3C are explanatory views showing the operations of the embodiment shown in FIGS. 2A to 2C;

DESCRIPTION OF THE PREFERRED EMBODIMENT

For a better understanding of the embodiment of the present invention, a conventional header driven type packet switching system will be first described with reference to FIGS. 4 through 6.

Figure 4:
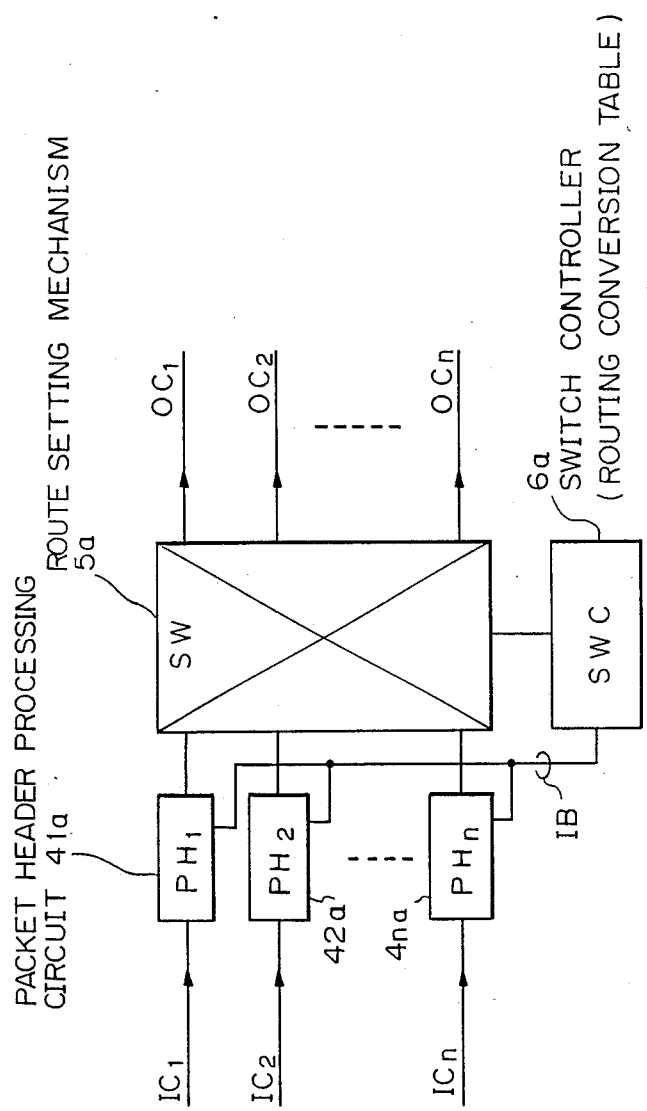
FIG. 4 is an explanatory view schematically showing a packet switching system of a prior art.

FIG. 4 shows a block diagram of a conventional header driven type packet switching system disclosed in Japanese Unexamined Patent Publication No. 61-127250. In the figure, the system includes a plurality of packet header processing circuits ($PH_l$) 41a to ($PH_n$) 4na which are provided in a fixed correspondence with incoming lines $IC_l$ to $IC_n$, a route setting mechanism 5a and a switch controller 6a including a routing conversion table.

Figure 5:
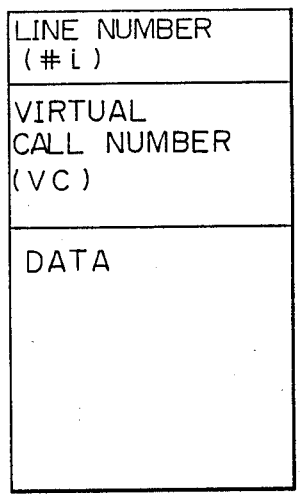
FIG. 5 is a view showing a data packet.
Figure 6:
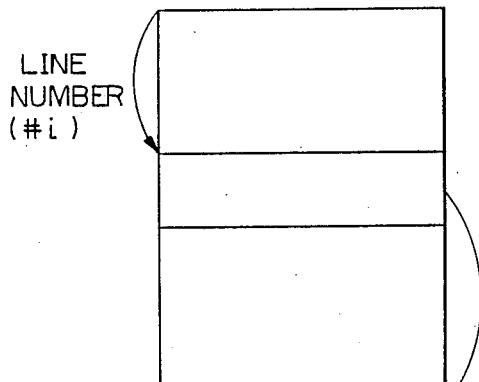
FIG. 6 is a routing conversion table.
Figure 6:
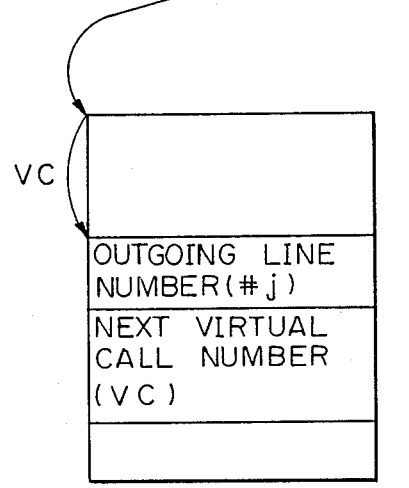

FIG. 5 is a view showing a data packet, and FIG. 6 shows the content of the routing converiion Table 6a.

Referring to FIGS. 4, 5 and 6, the operation is as follows. A data packet including a virtual call number VC and data is transmitted from a packet terminal (not shown in FIG. 4) through an incoming line, for example $IC_l$, to a packet header processing circuit ($PH_l$) 41a (also referred to as a packet handler). In the packet handler 41a, a line number #1 is given to the packet. This line number #i (i =1, 2, ..., or n) is previously stored in the corresponding packet handler ($PH_l$) 4ia. The switch controller (SWC) 6a receives the line number #i and the virtual call number VC from the packet handler ($PH_l$) 4ia through a bus IB.

The switch controller 6a then looks up the routing conversion table shown in FIG. 6 according to the line number #i and virtual call number VC in the data packet to find an outgoing line number (#j) and a next virtual call number VC. The switch controller 6a then rewrites the virtual call number of the data packet to the next virtual call number VC and erases the line number. Subsequently, the switch controller sends the data packet through the outgoing line number (#j).

Accordingly, the data packet transmitted through the incoming line ICi is transferred to the outgoing line $OC_j$.

The problem in the prior art header driven type packet switching system is that, since each packet handler is provided in a fixed correspondence with one incoming line, if a plurality of data packets are transmitted through, for example, the incoming line IC$_l$, the packet handler (PH$_l$) 41a can not process a data packet until the preceding data packet has been processed. That is, the data packets, which are transmitted through the incoming line IC$_l$ while the preceding data packet is being processed in the packet handler (PH$_l$) 41a, must wait until the preceding data packet has been completely processed. Therefore, a considerable delay occurs and much time is wasted, even though the remaining packet handlers are free.

Figure 1:
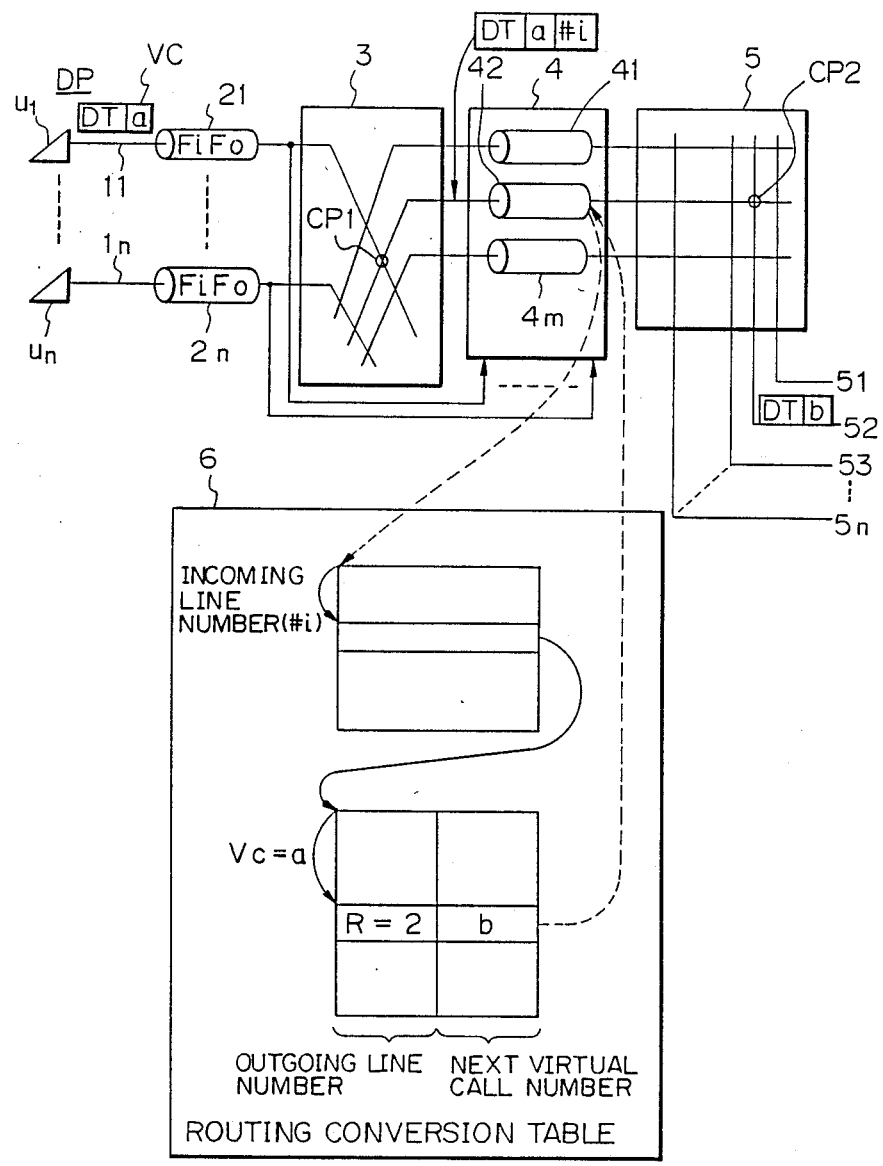
FIG. 1 is an explanatory view showing the principles of the present invention.

FIG. 1 is a block diagram showing a principal function of the header driven packet switching system according to the present invention.

To solve the problem mentioned above, the present invention provides, as shown in FIG. 1, incoming line circuits 21 to 26 having FIFO type buffers and corresponding to incoming lines 1$l$ to 1$n$ to which user packet terminals U1 through Un are connected. The incoming line circuits 2$l$ to 2$n$ are connected to a hunting portion 3, also referred to as "scanning circuits", for finding a free packet header processing circuit. Packet header processing circuits, i.e., packet handlers (hereinafter referred to as "PH's") 4$l$ to 4$m$ are provided in a PH pool 4. A routing conversion table 6 is disposed in each of the PH's 4$l$ to 4$m$, as typically shown in the figure for the PH 42. The PH's 4$l$ to 4$m$ are connected to a route setting mechanism 5 which is constituted by, for example, spatial matrix switches, and connected to outgoing lines 5$l$ to 5$n$.

A data packet DP from, for example, the packet terminal U1 (or a remote exchange), is stored in the incoming line circuit 21 having an FIFO buffer corresponding to the line. The data packet transmitted through the line 11 comprises user data DT and a virtual call number VC (VC="a" in the example shown in FIG. 1). In the FIFO buffer 21, an incoming line number #i (#i =11 in this example) is added to the data packet DP. When the data packet is received by the free PH hunting portion 3, a free PH (PH 42 in this example) is determined from among the PH's 41 to 43, which are arranged in the PH pool 4 so as to be independent from the incoming lines, that is, so as not to correspond to the lines. Then, a cross point CP1 between the incoming line circuit 21 and the PH 42 in the PH hunting portion 3 is closed to transfer the data packet plus the incoming line number #i =11, to the PH 42.

In the PH 42, the routing conversion table 6 is looked up with regard to the incoming line number and virtual call number of the received data packet, to find an outgoing line number R and a next virtual call number. As a result, the outgoing line number R =2, i.e., the second outgoing line number 52 and the next virtual call number "b", are determined and then, in the PH 42, the virtual call number is rewritten to VC =b. In the route setting mechanism 5, a cross point CP2 connecting the outgoing line number 52 with the PH 42 is closed to transmit the data packet.

When a next data packet is received by the free PH hunting portion 3 while the already received data packet is being processed in the PH 42, the free PH hunting portion 3 will find another free PH other than the PH 42. Therefore, the above-mentioned next data packet can be processed immediately without waiting for the finish of the processing in the PH 42.

In addition, by providing the free PH hunting portion 3, the ratio of the numbers between the incoming lines 11 to 16 and the numbers of the PH's 41 to 43 can be arbitrarily determined in accordance with the system design. Usually, the processing speed in each PH is lower than the processing speed in each of the incoming line circuits 21 to 26. Therefore, the number of PH's is usually greater than the number of incoming lines. However, when the traffic in each incoming line is not heavy, the number of PH's may be less than the number of the incoming lines.

An embodiment of the present invention will now be described.

(1) Constitution of the Embodiment

Figure 2A:
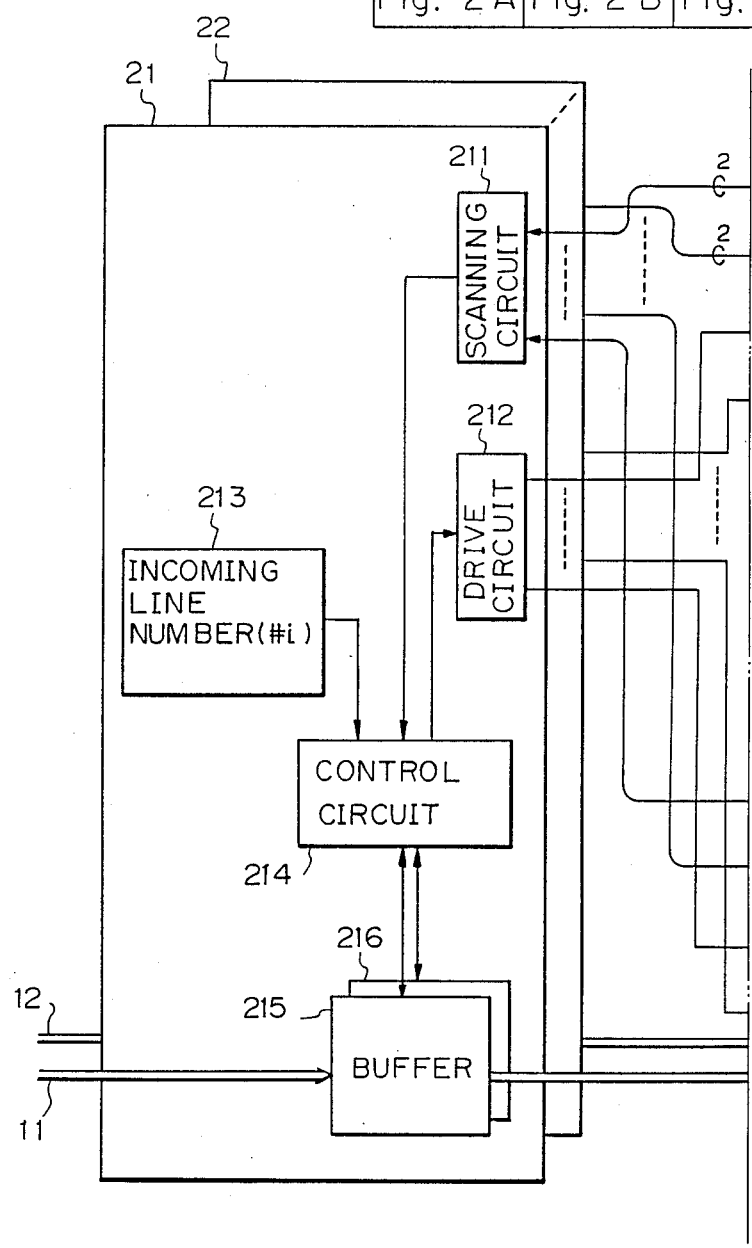
Figure 2B:
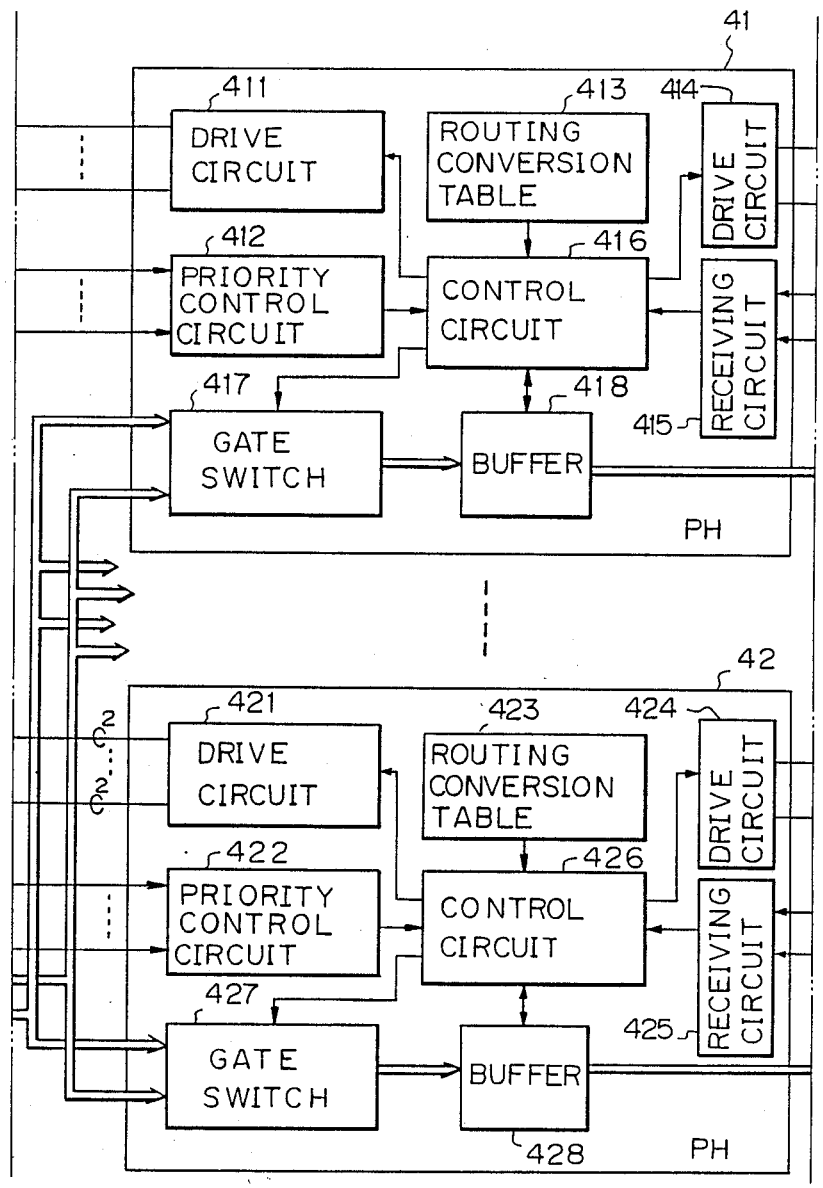
Figure 3A:
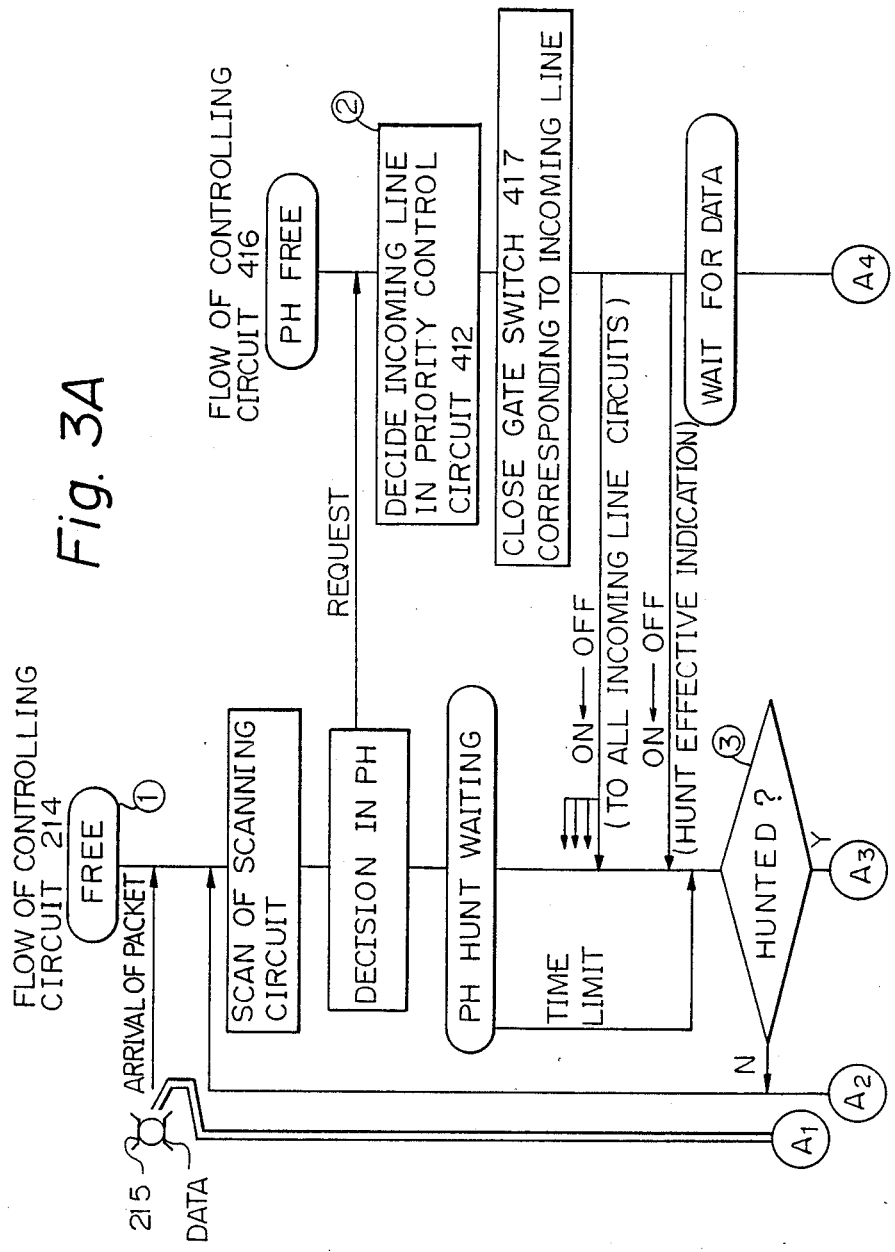
Figure 3C:
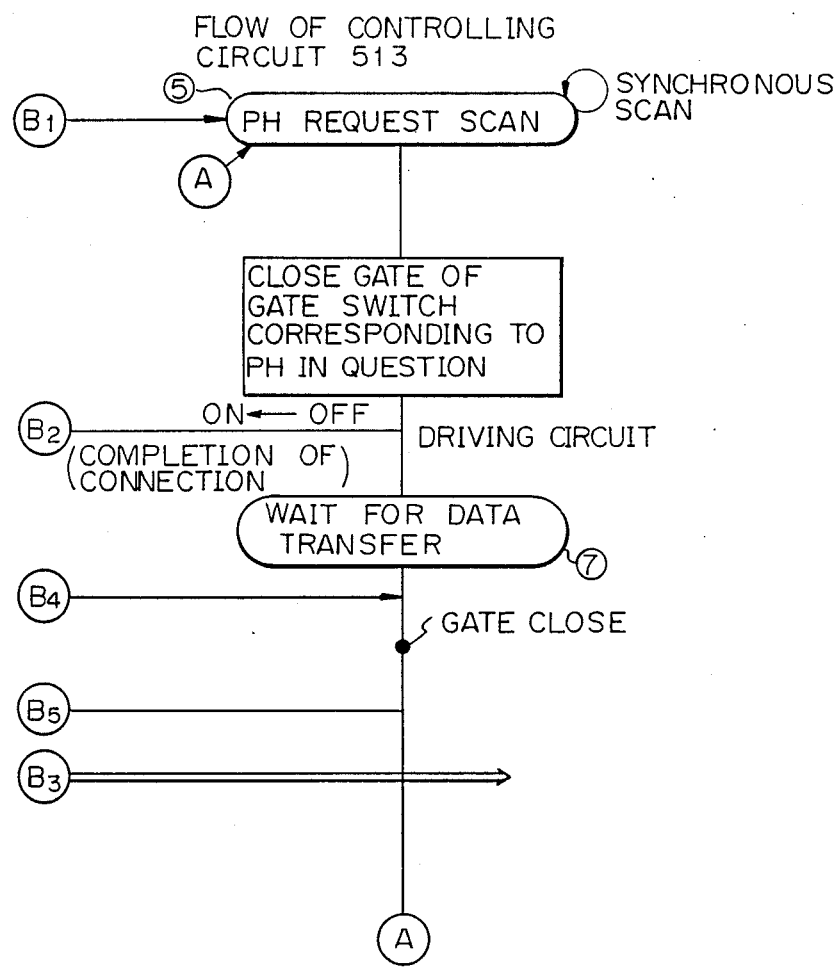

FIGS. 2A to 2C are views showing the constitution of an embodiment of the present invention, and the operation thereof will be described with reference to FIGS. 3A through 3C.

In FIGS. 2A to 2C, components represented by the same reference marks as those shown in FIG. 1 represent the same components. Also, numerals 11 and 12 represent incoming lines, 21 and 22 incoming line circuits, 41 and 42 PH's, 5a and 5b outgoing line circuits, and 51 and 52 outgoing lines.

The incoming line circuits 21 and 22 have the same constitution. The incoming line circuit 21 comprises a scanning circuit 211 for receiving free state signals from the PH's 41, 42, . . . , a drive circuit 212 for generating hunt requests with respect to the PH's 41, 42, . . . , an incoming line number memory 213 for storing an incoming line number, a control circuit 214 for totally controlling the incoming line circuit 21, and buffers 215 and 216 for temporarily storing data input from the incoming line 11.

The PH 41 selects a destination of the input data packet and comprises a drive circuit 411 for outputting a signal indicating whether or not the PH 41 is free, a priority control circuit 412 for determining which process request is to be selected when process requests are simultaneously generated by a plurality of the input line circuits 21, 22, . . . , a routing conversion table 413 for obtaining an outgoing line number and a next virtual call number VC for the input data packet according to the incoming line number #i and virtual call number VC of the input data packet, a drive circuit 414 for generating connection requests with respect to the outgoing line circuits 5a, 5b, . . . , a receiving circuit 415 for receiving connection completion signals, a control circuit 416 for totally controlling the PH 41, a gate switch 417 for enabling connection of one of the data transmission lines from among a group of the incoming line circuits, and a buffer 418 for temporarily storing the data packet. The routing conversion table 413 corresponds to the routing conversion table 6 shown in FIG. 1, and the scanning circuit 211, the drive circuit 212, and the control circuit 214 correspond to the free PH hunting portion 3 shown in FIG. 1.

The PH 42 has the same constitution as the PH 41, and comprises a drive circuit 421, a priority control circuit 422, a routing conversion table 423, a drive circuit 424, a receiving circuit 425, a control circuit 426, a gate switch 427, and a buffer 428, etc. The routing conversion table 423 may be the same as, for example, the table 413, which may be prepared simultaneously by a control packet.

The outgoing line circuit 5a transmits data packets transferred from the PH's 41, 42, . . . to the outgoing line 51, and comprises a terminating circuit 511 for receiving outgoing line connection requests transmitted from the drive circuits 414, 424, . . . of the PH's 41, 42, . . . , a drive circuit 512 for outputting connection completion signals to the receiving circuits 415, 425, .. of the PH's 41, 42, . . . , a control circuit 513 for totally controlling the outgoing line circuit 5a, a gate switch 514 for selectively connecting the outgoing line 51 to the PH's 41, 42, . . . , and a PH request FIFO type stacking memory 515 (the contents thereof being PH numbers) for stacking, in order of arrival, the connection requests transferred from the PH's 41, 42, . . . via the terminating circuit 511. The gate switch 514 includes gates 516, 517, 518, and 519, and a drive circuit 520 for selectively controlling the gates. The PH request stacking memory 515 processes the outgoing line requests in FIFO form so that the order of transfer of the data packets to the outgoing line will not be reversed.

The outgoing line circuit 5b has the same constitution as the outgoing line circuit 5a, to transmit data packets to the outgoing line 52.

(2) Operation of the Embodiment

The operation of the packet switching system of the present invention shown in FIGS. 2A to 2C will be described with reference to the flowchart shown in FIGS. 3A through 3C.

① In FIGS. 2A to 2C, a data packet from, for example, the incoming line 11, is stored in the buffer 215 of the incoming line circuit 21. After the storing, the buffer 215 triggers the control circuit 214 to start a scan by the scanning circuit 211 (step 301). The scanning circuit 211 terminates control lines connected to respective PH's, for indicating whether the PH's 41, 42, ... in the next stage are free (OFF) or busy (ON). The scanning circuit 211 also terminates control lines, connected to respective PH's, to indicate which of the PH's is not effective (for example, has an ON indication). When, for example, the PH 41 is determined to be free (OFF), the control circuit 214 causes the drive circuit 212 to generate a hunt request (OFF →ON) which is given to the priority control circuit 412 in the PH 41 (step 302). The control circuit 214 then transits a PH hunt wait state (step 303). The PH hunt wait state is repeated at every certain time limit.

② The control circuit 416 in the PH 41 starts to operate when activated by the priority control circuit 412, which terminates hunt request control lines from the incoming line circuits 21, 22, . . . . With respect to the process equests from a plurality of the incoming line circuits 21, 22, . . . , the priority control circuit 412 controls the competition thereamong and selects one incoming line circuit (in this example, the circuit 21) (step 304). In response, the control circuit 416 opens the gate switch 417 to connect the incoming line circuit 21 to a corresponding gate (step 305), thereby connecting the buffer 215 in the incoming line circuit 21 to the buffer 418 in the PH 41. In addition, the drive circuit 411 indicates to all of the incoming line circuits 21, 22, . . . , that the PH 41 is busy (OFF→ON) (step 306), i.e., is in use, as well as providing a PH hunt effectiveness indication (OFF →ON) for the selected incoming line circuit 21 (step 307). The PH 41 then is placed in a data wait state (step 308).

③ The control circuit 214, which is in the PH hunt wait state, confirms that the PH has been hunted according to the hunt effectiveness indication from the PH 41 to which the hunt request was directed (step 309). The control circuit 214 adds the incoming line number previously written in the incoming line number memory 213 to the data packet stored in the buffer 215 (step 310) and transfers the data packet with the incoming line number to the buffer 418 in the PH 41 (step 311). The second buffer 216, disposed to correspond to the incoming line, is then checked to see whether or not the data packet is stored therein (step 312). If the data packet is not stored, the incoming line circuit 21 is placed in a free state, (step 313), and if the data packet is stored, the operation returns to stage ①.

④ The control circuit 416 i the PH 41, which is in the data wait state, again starts to operate as soon as the dat packet arrives at the buffer 418, and closes the gate switch 417 to cut the connection between the buffers 215 and 418. The control circuit 416 indexes the routing conversion table 413 based on the incoming line number and virtual call number of the arrived data packet, takes an outgoing line number and a next virtual call number from the table (step 314), rewrites the virtual call number of the data packet (step 315), and causes the drive circuit 414 to generate an outgoing line connection request (OFF→ON) to an outgoing line circuit (circuit 5a in this example) corresponding to the outgoing line number (step 316). The PH 41 is then placed in a state for waiting for an outgoing line circuit connection (step 317).

⑤ The control circuit 513 in the outgoing line circuit 5a synchronously scans (step 318) the PH request stacking memory 515, which stacks, in order of arrival, outputs, i.e., outgoing line connection requests from the terminating circuit 511 which receives the outgoing line connection requests from the PH 41, 42, . . . , to identify the PH which has generated a particular connection request. Therefore, in this example, the control circuit 513 opens and connects the gate 516 of the gate switch 514 corresponding to the PH 41, and causes the drive circuit 512 to transmit a connection completion signal (OFF→ON) to the PH 41 (step 319). The circuit 5a is then placed in a data transfer wait state (step 320).

⑥ The control circuit 416 in the PH 41 again starts to operate after receiving the connection completion signal generated in stage ⑤, and transmits the data packet from the buffer 418 transmission line (step 321). After the completion of the transfer of the data packet, the control circuit 416 causes the drive circuit 414 to send a data transfer completion (ON→OFF) to the outgoing line circuit 5a (step 322). The PH 41 is then placed in a completion confirmation wait state (step 323). The data packet will be transferred to the outgoing line 51 through the gate switch 514 in the outgoing line circuit 5a.

⑦ According to the data transfer completion generated in stage ⑥, the control circuit 513 in the outgoing line circuit 5a again starts to operate to close, i.e., to disconnect, the gate 516 of the gate switch 514 (step 324). The control circuit 513 then causes the drive circuit 512 to send a completion confirmation (ON→OFF) to the PH 41 (step 323), and returns to the PH request scanning operation in stage ⑤.

⑧ The control circuit 416 in the PH 41 in the completion confirmation wait state starts to operate upon receipt of the completion confirmation generated in stage ⑦, to cause the drive circuit 414 to inform all of the incoming line consists 21, 22, . . . that the PH 41 itself is free (ON→OFF) (step 324). The PH 41 is then placed in a free state.

As described above, a packet switching system can be constituted with simple circuit groups to realize a high speed switching and improve a packet processing capacity of the system. The number of PH's can be selected depending on traffic conditions so that, if the traffic is light, the number may be smaller than the number of incoming lines, and if the traffic is heavy, the number may be larger than the number of incoming lines.

According to the switching system of the present invention, packet processing circuits of the system are arranged so as to be independent from the incoming lines, and therefore, the packet processing circuits act as buffers against traffic congestion in a particular route or against traffic congestion from a particular route, thus improve the flexibility of the system. In addition, the number of PH's of the system can be determined depending on traffic conditions, so that the system can be optimized, since a PH request stack of the system, of course, processes requests from the respective PH's in the order of arrival.

We claim:

1. A header driven packet switching system including hardware for routig a data packet coming through one of incoming lines and rewriting a header of said data packet according to routing information added to said header of said data packet, comprising:
   a plurality of packet header processing circuits disposed indpendently from said incoming lines, for controlling the routing and header rewriting of said data packet; and
   connecting means for detecting free circuits from among said plurality of packet header processing circuits, and for connecting said one incoming line with one of the detected free packet header processing circuits.

2. A header driven packet switching ssytem for routing individual data packets incoming through ones of a purality of incoming lines and rewriting a header of each of the data packets according to routing information added to the header, comprising:
   a plurality of packet header processing circuits, disposed independently from the incoming lines, for controlling the routing and header rewriting; and
   a plurality of incoming circuits connected between said incoming lines and said packet header processing circuits, each of said incoming circuits comprising
   a first buffer for temporarily storing one of the data packets coming through one of said incoming lines;
   a scanning circuit for scanning said plurality of packet header processing circuitss for free packet header processing circuits;
   first drive means for driving the free packet header processing circuits;
   incoming line number storing means; and
   first control means for controlling said first buffer, said scanning circuit, said first drive means, and said incoming line number sotring means,
   whereby, when said first buffer receives the one of the data packets, said first control means starts a scan by said scanning circuit to determine a free packet header processing circuit from aong said plurality of packet header processing circuits, modifies said received data packet stored in said first buffer by adding said incoming line number to said received data packet and stores the modified data packet into said first buffer, and drives said first drive means to open said free packet header processing circuit for receiving said modified data packet.

3. A header driven packet switching ssytem as set forth in claim 2, wherein said incoming circuits are respectively connected to said incoming lines, and the ratio of the number of said incoming circuits and the number of said packet header processing circuits is arbitrarily determined.

4. A header driven packet switching system as set forth in claim 2, wherein each of said packet header processing circuits comprises:
   second drive means connected to said scanning circuit in each of said incoming circuits, for determining whether or not said packet header processing circuit is free;
   a priority control circuit connected to said first drive means in each of said incoming circuits, for controlling competition among process requests from a plurality of said incoming circuits to determine which of said incoming circuits is to be processed;
   first gate means connected to said first buffer in each of said incoming circuits, for introducing said modified data packet stored in said first buffer to said free packet header processing circuit;
   second control means for controlling said second drive means and said first gate means, whereby when said priority control circuit determines which of said incoming circuits is to be processed, said second control means starts to operate to open said first gate means.

5. A header driven packet switching system as set forth in claim 1, further comprising:
   a plurality of incoming circuits or connecting said incoming lines to said connecting mmeans, each of said incoming circuits including first buffer means for temporarily storing one of the data packets incoming through one of said incoming lines, and incoming line number storing means for storing an incoming line number of the one of sai dincoming lines,
   wherein said connecting means comprises:
   scanning means for scanning said plurality of packet header processing circuits for free packet header processing circuits,
   first drive means for driving the free packet header processing circuits,
   first control means for controlling said first buffer means, said scanning circuit, said first drive means, and said incoming line number storing means so that when said first buffer means receives the one of the data packets, said first control means causes said scanning means to start scanning for free packet header processing circuits, modifies the packet data stored in said first buffer means, and drives said first drive means to open a scanned free packet header processing circuit to receive the modified packet data, and
   wherein each of said packet header processing circuits comprises:
   second drive means connected tosaid scanning means in each of said incoming circuits, for determing whether or not said packet header processing circuit is free;
   priority control means, connected to said first drive means in each of said incoming circuits, for controlling competition among process requests from a plurality of said incoming circuits to determine which of said incoming line circuits is to be processed,
   first gate means, connected to said first buffer means in each of said incoming circuits, for introducing said modified data packet stored in said first buffer means to said free packet header processing circuit, the second control means for controlling said second drive means and said first gate means, whereby when said priority control means determines which of said incoming circuits is to be processed, said second control means starts to operate to open said first gate means.

6. A header driven packet switching system as set forth in claim 4, further comprising a plurality of outgoing line circuits and wherein each of said packet header processing circuits further comprises:

a second buffer for temporarily storing said modified data packet passed through said first gate means;

routing conversion table means for storing a correspondence between an incoming routing information and an outgoing routing information;

third drive means for generating an outgoing connection request; and a receiving circuit for receiving a connection complete signal;

whereby, when said second buffer receives said modified data packet from said first buffer through said first gate means, said second control means starts to operate to close and first gate means and to look up said routing conversion table means to determine said outgoing routing information including a next virtual call number an outgoing line number, and to rewrite the header of said modified data packet in said second buffer with said outgoing routing information, said second control means drives said third drive means to output said outgoing connection request to a selected one of said outgoing line circuits corresponding to said outgoing line number.

7. A header driven packet switching system as set forth in claim 6, wherein each of said outgoing line circuits comprises:

stack memory means for sequentially storing said outgoing connection requests from said third drive means in a sequence of the generation of said outgoing connection requests;

fourth drive means for generating said connection complete signal;

second gate means having aplurality of gates each for gating said dat apacket stored insaid second buffer to a selected outgoing line; and third control means for controlling said stack memory means, said fourth drive means, and said second gate means whereby, when said third control means detects an outgoing connection request in said stack memory means, said third control means drives said second gate means to open a gate corresponding to the selected outgoing line and drives said fourth drive means to transfer said connection complete signal from said fourth drive means through said receiving circuit to said second control means so that said second control means drives said second buffer to transfer said rewritten data packet from said second buffer to transfer said rewritten data packet from said second buffer through said second gate means to said selected outgoing line.

8. A header driven packet switching method for routing a data packet coming through one of a plurality of incoming lines and rewriting a header of said data packet according to routing information such as a virtual call number and aline number added to said header of said data packet, comprising the steps of:

(a) detecting a free circuit from among a plurality of packet header processing circuits disposed independently from said incmoing lines; and (b) controlling the routing and header rewriting of said data packet based on the free circuit detected in step (a).

9. A header driven packet switching method as set forth in claim 8, wherein said detecting step comprises the steps of:

temporarily storing a data packet coming through an incoming line;

scanning said plurality of packet header processing circuits to determine a free packet header processing circuit among said plurality of packet header processing circuits;

adding an incoming line number to the temporarily stored data packet; and transferring the temporarily stored data packet plus the added incoming line number to said determined free packet header processing circuit.

10. A header driven packet switching method as set forth in claim 9, further comprising the steps of:

sending information from said packet header processing circuits to incoming line circuit means, about whether or not each of said packet header processing circuits is free;

controlling a competition among process request from a plurality of said incoming line circuits means to determine which of said incoming line circuit means is to be processed; and introducing said data packet to said free packet header processing circuit.

11. A header driven packet switching method as set forth in claim 9, wherein said controlling step comprises the steps of:

temporarily storing the transferred data packet;

looking up a routing conversion table means to determine an outgoing routing information including the next virtual call number and the outgoing line number;

rewriting the header of the transferred data packet with said outgoing routing information; and generating an outgoing connection request to one of a plurlaity of outgoing line circuits means corresponding to said determined outgoing line number.

12. A header driven packet switching method as set forth in claim 11, further comprising the steps of:

opening a gate, corresponding to an outgoing line in the one of the plurality of outgoing line circuit means, in response to said outgoing connection request;

transferring a connection complete signal from said outgoing line circuit means to said packet header processing circuit; and transferring said data packet from said packet header processing circuit through said gate to said outgoing line in the one of the plurality of outgoing line circuit means.

13. A header driven packet switching system as set forth in claim 5, further comprising a plurality of outgoing line circuits and wherein each of said packet header processing circuits further comprises:

second buffer means for temporarily storing said modified dat apacket passed through said first gate means;

routing conversion table means for storing a correspondence between an incoming routing information and an outgoing routing information;

third drive means for generating an outgoing connection request; and a receiving circuit for receiving a connection complete signal;

whereby, when said second buffer means receives said modified dat packet from said first buffer means through said first gate means, said second control means starts to operate to close said first gate means and to look up said routing conversion table means to determine said outgoing routing information including a next virtual call number and an outgoing line number, and to rewrite the header of said modified data packet in said second buffer means with said outgoing routing information, and said second control means drives said third drive means to output said outgoing connection request to a selected one of said outgoing connection request to a selected one of said outgoing line circuits corresponding to said outgoing line number.

* * * * *

UNITED STATES PATENT AND TRADEMARK OFFICE
CERTIFICATE OF CORRECTION

PATENT NO. : 4,920,531

DATED : April 24, 1990

INVENTOR(S) : Osamu Isono et al.

It is certified that error appears in the above-identified patent and that said Letters Patent is hereby corrected as shown below:

Col. 9, line 18, "routig" should be --routing--;
line 23, "indpendently" should be --independently--;
line 33, "purality" should be --plurality--;
line 47, "circuitss" should be --circuits--;
line 54, "sotring" should be --storing--;
line 58, "aong" should be --among--.

Col. 10, line 30, "mmeans" should be --means--;
line 35, "sai dincoming" should be --said incoming--;
line 56, "tosaid" should be --to said--.

UNITED STATES PATENT AND TRADEMARK OFFICE
CERTIFICATE OF CORRECTION

PATENT NO. : 4,920,531
DATED : April 24, 1990
INVENTOR(S) : Osamu Isono et al.

It is certified that error appears in the above-identified patent and that said Letters Patent is hereby corrected as shown below:

Col. 11, line 2, "the" should be --and--;
        line 28, "an" should be --and an--;
        line 43, "aplurality" should be --a plurality--;
        line 45, "dat apacket" should be --data packet--, "insaid" should be --in said--.

Col. 12, line 44, "plurlaity" should be --plurality--;
        line 64, "dat apacket" should be --data packet--.

Col. 13, line 6, "dat" should be --data--.

Signed and Sealed this

Fourth Day of June, 1991

Attest:

HARRY F. MANBECK, JR.

*Attesting Officer*      *Commissioner of Patents and Trademarks*